H. A. FARRAND.
FASTENING DEVICE.
APPLICATION FILED JUNE 12, 1909.
964,226.
Patented July 12, 1910.
4 SHEETS—SHEET 1.
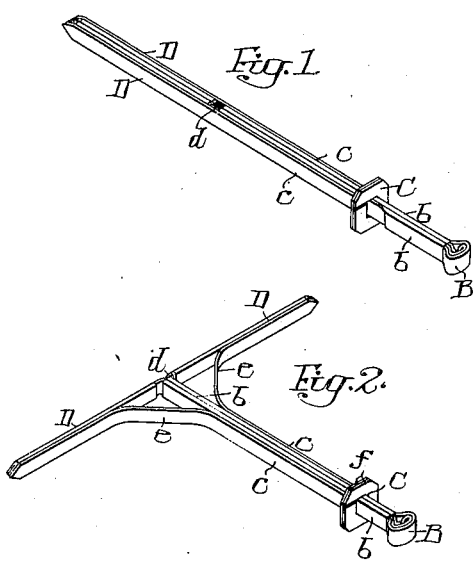
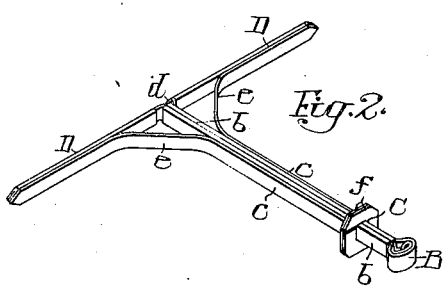
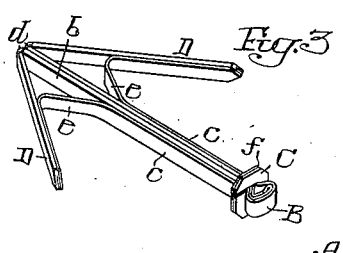
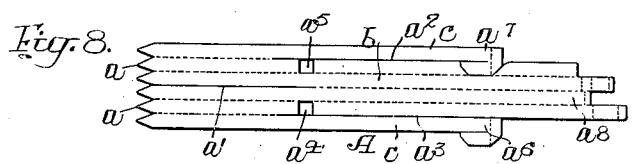
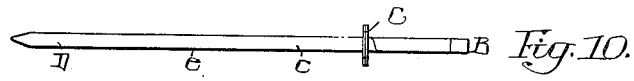
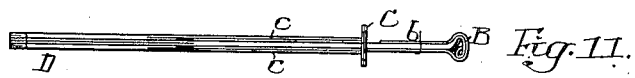
Witnesses:
Augustus B. Coppes
Nibla A. Burrowes
Inventor
Hiram A. Farrand.
by his Attorneys
Howson & Howson

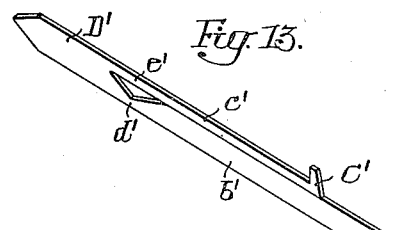
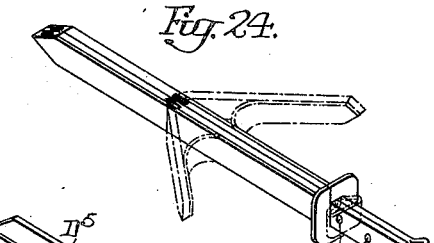
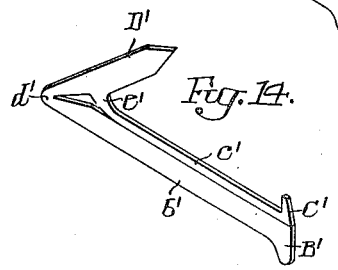
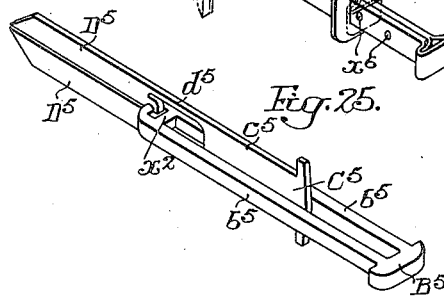
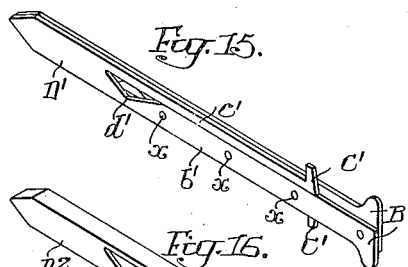
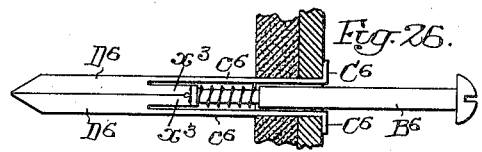
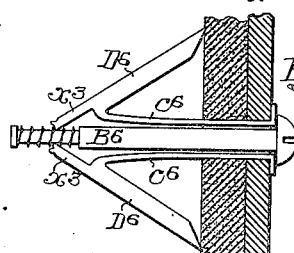
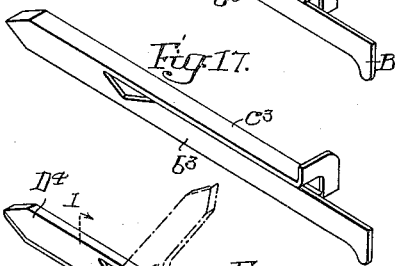
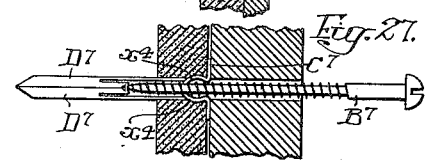
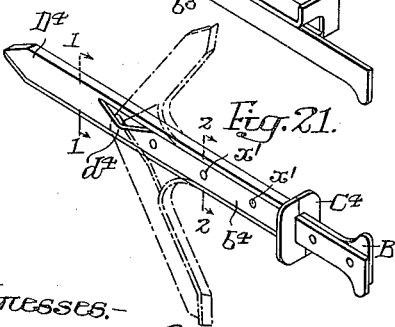
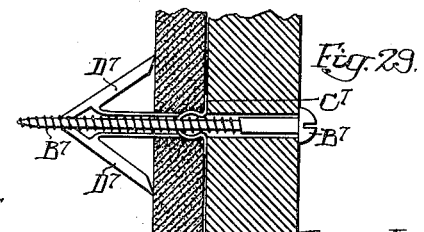
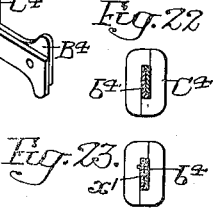

H. A. FARRAND.
FASTENING DEVICE.
APPLICATION FILED JUNE 12, 1909.
964,226.
Patented July 12, 1910.
4 SHEETS—SHEET 3.
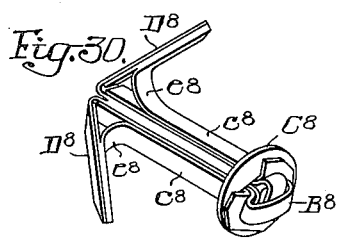
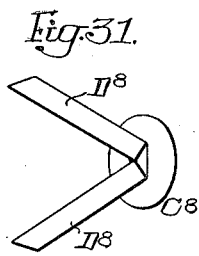
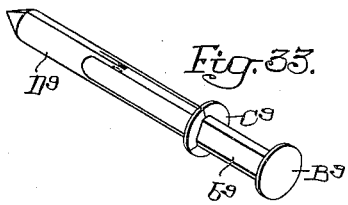
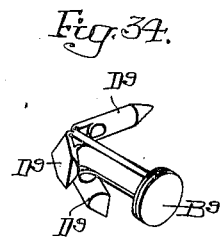
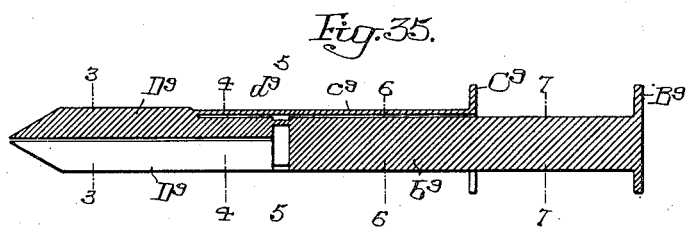
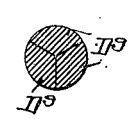
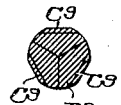
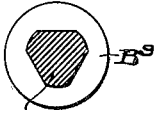
Witnesses:
Augustus B. Coppes
Nelle A. Burrowes
Inventor—
Hiram A. Farrand.
by his Attorneys—
Howson + Howson

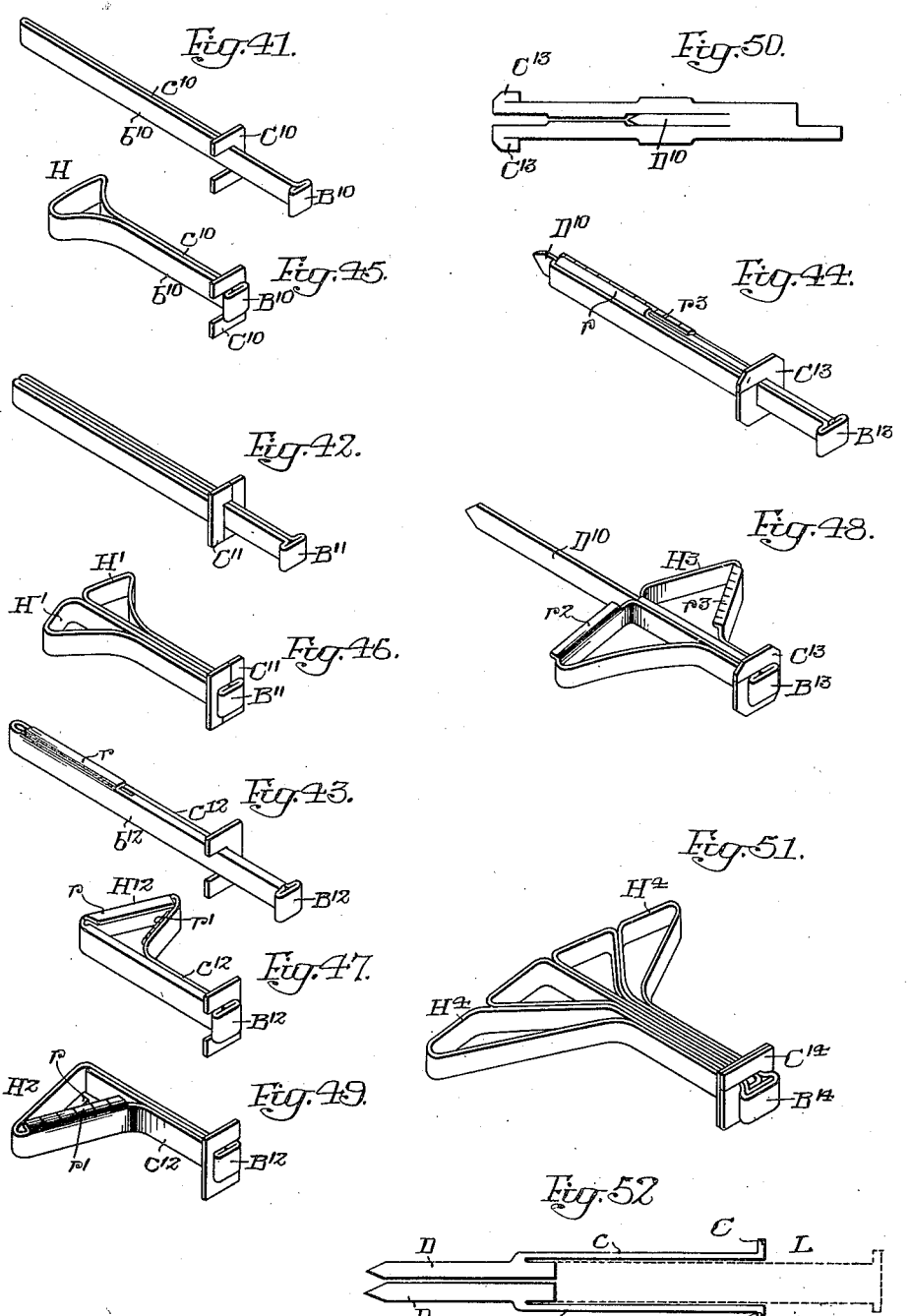

UNITED STATES PATENT OFFICE.

HIRAM A. FARRAND, OF PHILADELPHIA, PENNSYLVANIA, ASSIGNOR TO SELF-CLINCHING NAIL COMPANY, OF CAMDEN, NEW JERSEY, A CORPORATION OF NEW JERSEY.

FASTENING DEVICE.

964,226.  Specification of Letters Patent.  Patented July 12, 1910.

Application filed June 12, 1909. Serial No. 501,796.

*To all whom it may concern:*

Be it known that I, HIRAM A. FARRAND, a citizen of the United States, residing in Philadelphia, Pennsylvania, have invented certain Improvements in Fastening Devices, of which the following is a specification.

One object of my invention is to provide a fastening device adapted for holding objects together, particularly under conditions where access for the purpose of bolting, riveting, upsetting or clenching is difficult or impossible.

It is also desired to provide a fastening device particularly adapted for holding objects to a plaster or other similar wall or partition, which shall be so constructed that after having been suitably entered or driven into such wall it shall be expanded or turned over at the end so that its withdrawal shall be either exceedingly difficult or impossible, as the case may be.

I further wish to provide a fastener of relatively simple and inexpensive construction which shall be provided with two stems of which one is used when said fastener is being driven, after which the second is employed to cause the expansion or turning over of the end of the fastener in order to prevent its withdrawal.

These objects and other advantageous ends I secure as hereinafter set forth, reference being had to the accompanying drawings, in which:—

Figure 1, is a perspective view of the preferred form of fastener constituting my invention; Figs. 2 and 3, are perspective views illustrating the fastener in its partial and wholly expanded positions; Figs. 4 and 5, are vertical sections illustrating the fastener after having been driven, and after it has expanded respectively; Fig. 6, is an enlarged elevation of the head of the fastener in which the disposal of parts is slightly different from that shown in Figs. 1 and 2; Figs. 7 and 8, are respectively a side elevation and a plan of the stamping from which the form of my invention shown in the foregoing figures is made; Fig. 9, is a plan of the washer preferably employed as one of the heads; Figs. 10 and 11, are respectively a side elevation and an inverted plan of the fastener shown in Fig. 1; Fig. 12, is a diagrammatic view illustrating the principle of operation of the fastener shown in Fig. 1; Figs. 13 and 14, are two perspective views illustrating a modified form in its normal and in its expanded conditions, respectively; Fig. 15, is a perspective view illustrating a double pointed form of the fastener shown in Fig. 13; Figs. 16 and 17, are perspective views illustrating two other modifications of my invention; Figs. 18, 19 and 20, are vertical sections of the form of fastener shown in Figs. 15 to 17 inclusive; Fig. 21, is a perspective view of a double pointed form of the fastener shown in Figs. 17 and 20; Figs. 22 and 23, are vertical sections on the lines 1—1 and 2—2, Fig. 21; Figs. 24 and 25, are perspective views of two other modified forms of my fastener; Figs. 26 and 27, are sectional elevations showing a form of the fastener in which a screw is employed for expanding or turning over the point, said views illustrating the devices in their normal condition; Figs. 28 and 29, are elevations illustrating the fasteners of Figs. 26 and 27 in their expanded conditions; Figs. 30 and 31 are respectively a perspective and an inverted plan of a form of my fastener in which the expanded or turned over ends lie at a relatively small angle to each other; Fig. 32, is a transverse section of the stem of the fastener shown in Fig. 30; Figs. 33 and 34, are two perspectives illustrating a three-pointed fastener in its normal and in its expanded condition; Fig. 35 is an enlarged vertical section of the fastener shown in Fig. 33; Figs. 36 to 40 inclusive, are a series of vertical sections taken on the lines 3—3, 4—4, 5—5, 6—6, and 7—7, Fig. 35; Figs. 41 to 44 inclusive, are perspective views representing other modifications of my invention; Figs. 45 to 48 inclusive are perspective views illustrating the fasteners of Figs. 41 to 44 inclusive, in their expanded positions; Fig. 49, is an inverted perspective view of the expanded fastener shown in Fig. 47; Fig. 50, is a plan of the stamping from which the fastener of Fig. 44 may be made; Fig. 51, is a perspective view of a multi-pointed fastener in its expanded condition; and Fig. 52, is a plan, to some extent diagrammatic, illustrating a fastener in which the secondary stem is separable from the point and primary sections.

Referring to Figs. 7 to 12 inclusive of the above drawings, the preferred form of my improved nail or fastener consists of a piece of sheet metal A, preferably stamped in the form illustrated in Figs. 7 and 8, so that it has at one end six points $a$ and is provided with three longitudinal slits $a'$, $a^2$ and $a^3$ of which the first extends from the point end longitudinally for a little less than one-half the length of the stamping, while the other two slits are shown as extending from points adjacent to the head end of the nail longitudinally for something over one-half the distance toward the point end. In addition, there are removed from the stamping two square pieces of metal to form openings $a^4$ and $a^5$ so placed that the first opening $a^4$ lies between the adjacent ends of the slits $a'$ and $a^3$, while the other opening lies between the slits $a'$ and $a^2$.

The head end of the nail is preferably formed in three parts, of which two of the parts, $a^6$ and $a^7$, lie about one-quarter of the distance away from the extreme head end, while a third part $a^8$ constitutes such extreme end, and is preferably notched as shown. As a result of this formation, it is possible to fold up the stamped out sheet A to make the nail structure shown in Figs. 1, 4, 10 and 11, in which the part $a^8$ of the stamping becomes a secondary head B and the parts $a^6$ and $a^7$ become the primary head C. The central portion of the stem between the two parts $a^6$ and $a^7$ down to the two holes $a^4$ and $a^5$ becomes the inner or secondary stem $b$, while the outside or primary stem sections of the stamping immediately adjacent to the two slits $a^2$ and $a^3$ lie on opposite sides of the stem $b$ and terminate at one end in the primary head C.

The point end of the nail consists of two parts D each formed of three parallel layers of metal folded one on top of the other, each of which, however, is, on account of the two holes $a^4$ and $a^5$, connected to its portion of the stem by a single layer or thickness $d$ of metal and is also connected to each one of the outer stem sections $c$ by a second single layer $e$ of metal. As a result of this peculiar arrangement of parts the nail structure is in effect the formation shown in Fig. 12, that is to say, its two point sections D are united by relatively weak parts $d$ with a central inner stem $b$ which terminates in the secondary head B. The primary head sections C are connected through the outer stem sections $c$ with portions of the point sections adjacent to the weak connecting parts $d$, with the result that if by means of any suitable tool in engagement with the primary head C the nail be driven through the structure F into and through a thin plaster partition, wall, or other structure G, it finally comes to rest in the position shown in Fig. 4 with its primary head C in engagement with the outer surface of the said structure F. If now its secondary stem $b$ be forced inwardly, the point sections D are caused to turn on the inner ends of the primary stem sections $c$ as pivots or fulcrums. These ends themselves swing away from the secondary stem $b$ so that the inner end of the nail assumes the form shown in Fig. 5, until when the secondary head has been driven into contact with the primary head, the extreme ends of the point sections D come into engagement with and embed themselves in the adjacent rear surface of the plaster or other structure G. It is obvious that this turning over or expansion of the ends of the nail is facilitated by reason of the weakened connections $d$ between the secondary stem $b$ and the point sections D and is due to the fact that this latter stem section is forced inwardly, while the primary head sections C prevent further inward movement of the primary stem sections $c$.

In order to reinforce the primary head B I may provide it with a washer $f$ as shown in Fig. 9, placed immediately under the turned over ends of the parts $a^6$ and $a^7$.

It is obvious that a nail of this construction can not be withdrawn except by the application of an abnormal force greater than could ordinarily be applied, for the reason that such withdrawing force would merely tend to further embed the ends of the sections D in the rear face of the wall or structure G.

In its simplest form, my invention may be constructed as illustrated in Figs. 13 and 14, in which case it consists of a single thickness of flat metal so cut as to have a secondary head B', a primary head C', and a point section D' connected by a primary stem section $c'$ attached to one of its sides with the primary head C'.

The stem section $b'$ is connected to the point section D' through a weakened or partially cut away section $d'$, so that after having been introduced into and through two structures to be connected to each other, so that the primary head C' is held when the secondary head B' is driven in, the point section D' is necessarily swung around into the position shown in Fig. 14, the weakened section $d'$ and the end $e'$ of the stem bending to permit of this change of position. In this case, as in that previously described, the point of the nail is clenched or expanded within the wall so that even though this be relatively thin and of such a nature as to ordinarily provide but a poor hold for a nail of the well known construction, it is possible with my nail to rigidly and permanently connect or hold to said wall any desired structure.

In Fig. 15, I have shown a form of my invention which consists in effect of two nails of the form shown in Fig. 13 fastened side by side by means of rivets $x$ connecting their suitably overlapped stems $b'$. These two parts, however, are oppositely placed so that one of the stem portions $c'$ is at one edge of the nail, while the other is at the opposite edge. As a result of this construction, after the nail has been entered in the structure which it is desired to connect, the driving inwardly of the secondary heads B' causes one of the sections D' to be turned over or bent upwardly, as in the case illustrated, while the other is turned downwardly.

A somewhat more substantial form of nail than that of Fig. 13, is shown in Figs. 16 and 19, in which a secondary stem section $b^2$ with a portion of the section $D^2$, lies in one plane while the other part of the point section lies in a second plane at right angles to the first and in continuation of the primary stem section $c^2$. When a nail of this form has its head $C^2$ held and its secondary head $B^2$ driven inwardly, the metal bends at the narrow or weakened portion $d^2$ so that the point $D^2$ as a whole turns over, the primary stem section $c^2$ bending as before explained.

Again, the nail may be made as shown in Figs. 17 and 20, in which the stem sections $b^3$ and $c^3$ as well as the point are made of a channel shaped section;—otherwise the construction and operation of the various parts under conditions of use are the same as previously explained.

The form of the invention shown in Figs. 21 and 22, consists of two similar nails of the general type shown in Figs. 16 and 19, placed side by side and rigidly connected by rivets $x'$ extending through their adjacent secondary stem sections $b^4$. That is, each part of the point $D^4$ is L-shaped in section and there is the customary weakened portion $d^4$ connecting each point section with its corresponding secondary stem section $b^4$, so that when the heads $B^4$ are driven inwardly relatively to the primary heads $C^4$, said point sections are forced to expand or turn as shown in dotted lines.

In the case of Fig. 24, the nail consists of two rolled up pieces of sheet metal so arranged that their secondary stem sections are adjacent to each other. These sections are rigidly connected by rivets $x^6$ so that the various parts under conditions of use act as do the similar elements of the nail shown in Fig. 1.

The form of nail shown in Fig. 25, consists of a pair of stampings of which the first possesses a primary head portion $C^5$ and a primary stem $c^5$, on each side of which extend two relatively narrow or weakened portions $d^5$ which respectively carry the two point sections $D^5$. There is thus left an opening between the adjacent ends of the stem section $b^5$ and the point sections $D^5$, through which extends a cross bar $x^2$ connecting said two secondary stem sections $b^5$, whose outer ends are connected by a secondary head $B^5$. Although the nail is thus formed of two independent portions, the driving inwardly of the secondary head $B^5$ while the primary head is held, will cause the cross bar $x^2$ to act upon the point section so as to bend the narrow relatively weak parts $d^5$ and cause said point sections to be turned over or bent backward as desired.

The nail illustrated in Figs. 26 and 28 has point sections $D^6$ connected through primary stem sections $c^6$ with a primary head section $C^6$. Each of the point sections has extending toward the head section a prolongation $x^3$ and for the purpose of spreading or turning over said point sections, I provide a screw $B^6$ designed to perform the functions of the secondary stem. Under operating conditions this screw is driven or forced inwardly until its threaded portion separates the point sections $D^6$, which are thus caused to bend the relatively weak stem sections $c^6$ so that as before they embed their points in the rear faces of the structure through which the nail passes. The screw may be set up tight by turning and will be maintained in this position by virtue of the fact that the ends of the prolongations $x^3$ are in engagement with the threads of the screw.

The construction shown in Figs. 27 and 29 is very similar to that shown in Fig. 26 except that the primary head $C^7$ is provided with what may be described as a nut portion $x^4$ designed to engage the threads of the screw $b^7$ so that this may be screwed inwardly through the nut in order to gradually and forcibly separate and turn over the point sections $D^7$. In some cases it may be desirable that the point sections be made to turn over in planes at an angle to each other instead of in the same plane as in the cases hitherto described, and under these conditions, I may construct the parts as shown in Figs. 30, 31 and 32. That is to say, the nail is constructed of a stamped out sheet of metal folded as shown in section in Fig. 32, and having its two secondary stem sections $b^8$ joined along one edge. The point sections $D^8$ are, as in the other cases described, connected with their stem sections through a narrow or weakened part and also, through portions $e^8$, with the primary stem sections $c^8$. The arrangement is such that when the primary head $C^8$ is held and the secondary head $B^8$ is driven toward the same, the two point sections $D^8$ are turned over and caused to point backwardly as shown in Fig. 30, so that they, with their primary stem sections, lie in planes at an angle to each other, which as shown in Fig. 31, is about 75°.

In Figs. 33 to 40 inclusive I have illustrated a form of my invention having three point sections $D^9$, each of which is connected to the same secondary stem section $b^9$ by a narrow or weakened portion $d^9$. Connected to each of the point sections is a primary stem section $c^9$ and the ends of all of the latter sections are turned over and properly shaped to form a single head C⁹. When this latter is held and the head B⁹ is driven inwardly, the three point sections assume the position shown in Fig. 34, so that they, with their primary stem sections, lie in planes at about 120° to each other.

In Figs. 41 to 52 inclusive, I have illustrated modified forms of my invention, which while possessing the distinguishing features of those heretofore described, are particularly characterized by having one or more relatively blunt sections which, when the primary head is held and the secondary head forced inwardly, expand into an enlarged end portion and practically attain the same end as secured by the other forms of my nail. Thus in Figs. 41 and 45, the nail is formed of a single relatively long, narrow strip folded upon itself near its middle point, and having its ends turned over to form heads C¹⁰ and B¹⁰. The portion $c^{10}$ of the strip attached directly to the head C¹⁰ in this case, forms the primary stem, while the other part $b^{10}$ forms the secondary stem. Under conditions of use as heretofore described, the end portions of the two sections spread out to form a holding end H which effectually serves not only to prevent the nail being withdrawn, but also rigidly holds it in a material not otherwise capable of accomplishing this end.

The form of nail shown in Figs. 42 and 46 is in effect merely a double form of that shown in Figs. 41 and 45, although for convenience sake it may be made of a single continuous strip bent and expanded at its middle point to form the secondary head B¹¹ and again bent so as to be turned upon itself at its quarter points, while its ends are shaped so that they together form the primary head C¹¹. In this case when the nail has been driven, its relatively blunt forward end expands into two holding ends H'.

In Figs. 43, 47 and 49, I have shown another form of my nail particularly designed to limit or determine the point at which the bending of the various parts will occur when the secondary head is driven toward the primary head. With this idea in view, the nail is formed of a stamped and laterally folded strip of material having at the lower end of its secondary stem section $b^{12}$ a side flange $r$ bent over so as to lie at right angles to said stem. Similarly, the primary stem section $c^{12}$ has along the lower half of its length a similarly turned over edge or flange $r'$ which extends along that edge on the opposite side of the nail from that having the flange $r$. With this arrangement of parts, the driving inwardly of the secondary head B¹² necessarily causes the lower part of the secondary stem section to bend where it is weakest, that is, at the upper end of the flange $r$. Similarly, the form of the expanded head portion H² is determined by the fact that the material necessarily bends between the flange $r$ and the flange $r'$, and also at the point where this latter flange ends adjacent to the upper part of the primary stem section. As a result, the driven nail takes the form shown in Figs. 47 and 49.

If for any reason it be desired to provide a nail having a hole forming point which shall aid in retaining the nail in the material into which it is driven, in combination with an expanding end portion or portions, I may form the nail as shown in Figs. 44, 48 and 50. This form of the invention is as before, constructed of a single stamped sheet of material which may be made as shown in Fig. 50. This is folded or bent into the structure shown in Fig. 44, so that it consists essentially of an expanding nail of the type shown in Fig. 42, having two primary sections, two secondary sections, and a point section D¹⁰. In addition, the lower or point end of one of the secondary stem sections is provided with an edge flange $r^2$, while the primary stem section of the other one of the holding ends H³ is provided with an edge flange $r^3$. As a consequence of this construction, when the primary head C¹³ is held, and the secondary head B¹³ is forced inwardly, the point section D¹⁰ is driven straight into the material in which the nail is to be placed, while the two holding ends H³ are caused to expand into definite forms, by reason of the two edge flanges $r^2$ and $r^3$ as shown in Fig. 48.

Fig. 51, shows another possible form of my nail consisting of a number of double strips of material which when expanded has the form illustrated. It is in effect, a combination of four nails of the construction shown in Fig. 41, so that when the primary head C¹⁴ is held, the driving inwardly of the secondary head B¹⁴ will cause the four inner ends to expand, so as to form a single holding end made up of four expanded ends H⁴.

It will be noted that in such forms of my invention as those shown in Figs. 1, 15, 30, 33, 42, and others, the primary and secondary stem portions constitute what is in effect the body of the nail, at the head end of which a portion projects beyond the remainder. It is the moving inward of this projecting portion which causes the expansion or lateral movement of the point or end holding sections to accomplish the end desired.

It is of course obvious that my invention covers and includes such a modification as that of Fig. 52, in which while the secondary stem does not have an integral portion extending beyond the ends of the primary stem sections, a driving member L such as a punch or even a common nail may be employed to accomplish the desired end.

I claim:—

1. The combination in a nail of a stem section having a holding head, with a point section fulcrumed to and integral with the stem section, and a device for turning said point section laterally relatively to the stem section.

2. The combination in a fastener of a plurality of laminations constituting primary and secondary stem sections and a point section; the stem sections being longitudinally movable relatively to each other and the point section being made in a plurality of separable parts each connected both to the primary and to the secondary stem sections.

3. The combination in a nail of a primary stem section having a holding head, a secondary stem section, with a point section integral with said other sections and capable of lateral movement when relative movement occurs between the same.

4. The combination in a nail of two sections extending one beyond the other, one section having a holding head, with a point section connected to both of said sections and consisting of two integral parts capable of being spread.

5. A nail consisting of two relatively movable stem sections of which one extends beyond the other; and a point section integrally connected with each section and adapted to be spread by the relative movement of said stem sections.

6. A nail consisting of two stem sections and a point section integrally connected thereto, the connection between the sections being constructed to cause lateral movement of the point section when one of the stem sections is moved relatively to the other.

7. A nail consisting of a single stamping of sheet metal bent to form two stem sections of which the end of one extends beyond the end of the other; and a point section integrally and movably connected with each stem section.

8. The combination in a nail of two relatively movable stem sections and a point section integrally connected to both of said stem sections, the connection between said point and one of said stem sections being relatively weak.

9. The combination in a nail of a primary stem section having a head, a secondary stem section projecting beyond said primary head and also having a head, with a point section integrally connected to and operated by relative movement of, said stem sections.

10. A nail consisting of a plurality of point sections and a body including a part projecting beyond the remainder, with means integrally connecting the point sections to the body to cause them to project laterally when said projecting part is moved toward the main portion of the body.

11. A nail made from an integral body of metal cut at predetermined points and having a body consisting of two stem sections and a point section connected thereto so as to be moved laterally by relative movement of the other sections, with a holding head for one of said sections.

12. A nail made from an integral body of metal cut at predetermined points and having a body consisting of two stem sections in combination with a point section, one stem section projecting beyond the end of the other, with a holding head for said latter section.

13. A nail made from a single body of metal and having a plurality of point sections, a body portion consisting of stem sections movable relatively to each other, one of said stem sections having a holding head and being connected to the point section by a portion relatively weaker than the remainder.

14. A nail consisting of two relatively movable stem sections and a point section attached thereto, one of the stem sections being connected to the point by a relatively weak portion and the other being connected to said point by a side section.

15. A nail consisting of two relatively movable stem sections and a point section attached thereto, one of the stem sections being connected to the point by a relatively weak portion, and the other being connected to said point by a side section, one of the stem sections projecting beyond the other.

16. The combination of two integral stem sections with a point section movably connected thereto, said parts being constructed to cause lateral movement of said point section when one of the stem sections is moved relatively to the other.

17. The combination in a nail having two relatively movable stem sections and a plurality of integral point sections adapted to be laterally spread so as to lie in planes respectively at an angle to each other when one stem section is movable relatively to the other.

18. A fastening device consisting of a body of sheet metal having a plurality of folds; a portion of said body being formed as a point section and other parts thereof being formed to constitute stem sections of which one is fulcrumed to the point section; another of the stem sections being placed to act on the point section so as to be capable of turning the same on its fulcrum.

19. A fastening device consisting of a single body of sheet metal formed in a plurality of folds, certain of said folds extending beyond the other folds to form a stem and being connected to them so as to be capable of causing lateral movement of a portion thereof when relative movement of the folds occurs.

20. A fastening device consisting of a body of sheet metal formed in a plurality of compact folds of which certain are formed as a holding head and others extend beyond the same to form a stem section, a certain portion of said body being formed to constitute a point section capable of moving laterally relatively to the stem section when the extended part of the latter is driven toward the head section.

21. A fastening device consisting of a body of sheet metal formed into a number of folds of which a portion is shaped to form a holding head, and another part extends beyond said head to form a driving stem; there being portions of the metal cut away to weaken the connection between the end portions of the stem and the remainder thereof.

22. A fastening device consisting of an integral body of metal having a divided point portion and a body connected to said point portion by a section of the material of a cross section different from that of the other parts, whereby the device is rendered structurally weaker at the connection of the body and point portions; said body portion being made in a plurality of sections longitudinally movable relatively to each other.

23. A fastening device consisting of a single body of metal bent into a plurality of folds, a portion of one end of the body constituting a secondary stem and the remainder of said end constituting a primary stem having a holding head, with a point section connected at one end of the secondary stem and also connected to the primary stem at a distance from said end.

24. A fastening device consisting of a single body of metal bent into a plurality of folds, a portion of one end of the body constituting a secondary stem and the remainder of said end constituting a primary stem having a holding head, with a point section connected at one end of the secondary stem and also connected to the primary stem at a distance from said end; said pointed section being relatively weak at its point of connection with the secondary stem section.

25. A fastening device consisting of a body of sheet metal formed into a number of compact folds of which a portion constitutes a secondary stem section; there being folds on opposite sides of said section constituting a primary stem section, the opposite end of said body of metal forming two point sections both connected to the secondary stem section and each connected to one of the parts of the primary stem section.

26. A fastening device consisting of a body of sheet metal formed into a number of compact folds, a portion of said body being formed into a secondary stem section and having folds at its sides together constituting a primary stem section, the opposite end of said body of metal forming two point sections both connected to the secondary stem section and each connected to one of the parts of the primary section, with a washer encircling the primary and secondary stem sections to form the holding head for said primary section.

27. The combination in a fastener of a primary stem section having a holding head; with a point section made in a plurality of integral parts; and means for causing lateral movement of the parts of the point section.

28. The combination in a fastener of a primary stem section having a holding head; a secondary stem section; with a point section integral with said secondary section and capable of lateral movement when relative movement occurs between the stem sections.

29. The combination in a fastener of a primary stem section having a holding head; a secondary stem section; with a point section integral with said primary section and capable of lateral movement when relative movement occurs between the stem sections.

In testimony whereof, I have signed my name to this specification, in the presence of two subscribing witnesses.

HIRAM A. FARRAND.

Witnesses:
WILLIAM E. BRADLEY,
WM. A. BARR.